(12) United States Patent
Lim et al.

(10) Patent No.: US 7,655,897 B2
(45) Date of Patent: Feb. 2, 2010

(54) SYSTEM AND METHOD FOR PERFORMING AN OPTICAL TRACKING OPERATION USING RELATIVE REFERENCING

(75) Inventors: Teng Hun Lim, Gelugor (MY); Meng Whui Tan, Sungai Ara (MY); Nobutaka Itagaki, Setagaya (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 12/103,660

(22) Filed: Apr. 15, 2008

(65) Prior Publication Data

US 2009/0256724 A1  Oct. 15, 2009

(51) Int. Cl.
*G01B 9/02* (2006.01)
(52) U.S. Cl. .............. 250/221; 250/222.1; 345/167
(58) Field of Classification Search ......... 250/221, 250/222.1; 345/156–167; 356/614–624; 33/1 M, 11, 707
See application file for complete search history.

(56) References Cited

U.S. PATENT DOCUMENTS

| | | | |
|---|---|---|---|
| 7,065,258 B2 * | 6/2006 | Nahum | 382/278 |
| 7,511,825 B2 * | 3/2009 | Itagaki | 356/498 |
| 7,525,082 B2 * | 4/2009 | Itagaki | 250/221 |
| 2002/0114022 A1 * | 8/2002 | Tanaka et al. | 358/496 |
| 2007/0262243 A1 * | 11/2007 | cheah et al. | 250/214 R |
| 2007/0291272 A1 * | 12/2007 | Itagaki | 356/450 |
| 2008/0204761 A1 * | 8/2008 | Itagaki | 356/519 |
| 2008/0260262 A1 * | 10/2008 | Lim et al. | 382/218 |

* cited by examiner

Primary Examiner—John R Lee (57) ABSTRACT

A system and method for performing an optical tracking operation computes a translated movement value of a displacement values using a relationship between a reference displacement value derived using a reference surface and a corresponding displacement value using a target surface. The displacement value is produced using image correlation by optically sensing the target surface. The translated movement value is used for the optical tracking operation.

20 Claims, 5 Drawing Sheets

SYSTEM AND METHOD FOR PERFORMING AN OPTICAL TRACKING OPERATION USING RELATIVE REFERENCING

BACKGROUND OF THE INVENTION

Optical navigation systems detect relative movements between the optical navigation systems and navigation surfaces to perform tracking operations. An optical navigation system uses a light source to generate illumination light on a navigation surface and an image sensor to successively capture frames of image data of the navigation surface using reflected illumination light. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data. Optical navigation systems are commonly used in optical computer mice to track the movements of the mice relative to the navigation surfaces on which the mice are manually manipulated.

Recently, there is a growing interest in using optical navigation systems to perform tracking operations, which have traditionally used encoders. As an example, optical navigation systems can be used in mobile robotic devices to optically track the movements of the mobile robotic devices. As another example, optical navigation systems can be used in printers to optically track the movements of sheets of paper. Unlike encoders, optical navigation systems do not have moving components that can breakdown and cause the optical navigation systems to malfunction. Furthermore, optical navigation systems do not suffer from erroneous readings due to slippage between the optical navigation systems and the navigation surface. However, conventional optical navigation systems do not perform uniformly on different surfaces, and thus, have accuracy issues when used on different surfaces.

Thus, there is a need for a system and method for performing an optical tracking operation with accuracy.

SUMMARY OF THE INVENTION

A system and method for performing an optical tracking operation computes a translated movement value of a displacement values using a relationship between a reference displacement value derived using a reference surface and a corresponding displacement value using a target surface. The displacement value is produced using image correlation by optically sensing the target surface. The translated movement value is used for the optical tracking operation.

A system for performing an optical tracking operation in accordance with an embodiment of the invention comprises an optical sensor unit configured to optically sense a target surface to produce at least a first displacement value along a first direction using image correlation, and a processing unit operably connected to the optical sensor unit to receive the first displacement value. The processing unit is configured to compute a translated movement value from the first displacement value using a relationship between a reference displacement value derived using a reference surface and a corresponding displacement value using the target surface. The translated movement value is used for the optical tracking operation.

A system for performing an optical tracking operation in accordance with another embodiment of the invention comprises an optical sensor unit and a processing unit. The optical sensor unit is configured to optically sense a target surface to produce at least a first displacement value along a first direction. The optical sensor unit comprises a light source configured to emit illumination light toward a target surface, an image sensor array positioned to receive the illumination light reflected from the target surface, the image sensor array being configured to generate frames of image data in response to the received illumination light, and a navigation engine operably connected to the image sensor array to receive the frames of image data, the navigation engine being configured to correlate the frames of image data to produce at least the first displacement. The processing unit is operably connected to the optical sensor unit to receive the first displacement value. The processing unit is configured to compute a translated movement value from the first displacement value using a relationship between a reference displacement value derived using a reference surface and a corresponding displacement value using the target surface. The translated movement value is used for the optical tracking operation.

A method for performing an optical tracking operation in accordance with an embodiment of the invention comprises electronically capturing frames of image data of a target surface, correlating the frames of image data to produce a first displacement value along a first direction, and computing a translated movement value from the first displacement value using a relationship between a reference displacement value derived using a reference surface and a corresponding tracking displacement value derived using the target surface. The translated movement value is used for the optical tracking operation.

Other aspects and advantages of the present invention will become apparent from the following detailed description, taken in conjunction with the accompanying drawings, illustrated by way of example of the principles of the invention.

DETAILED DESCRIPTION

Figure 1:
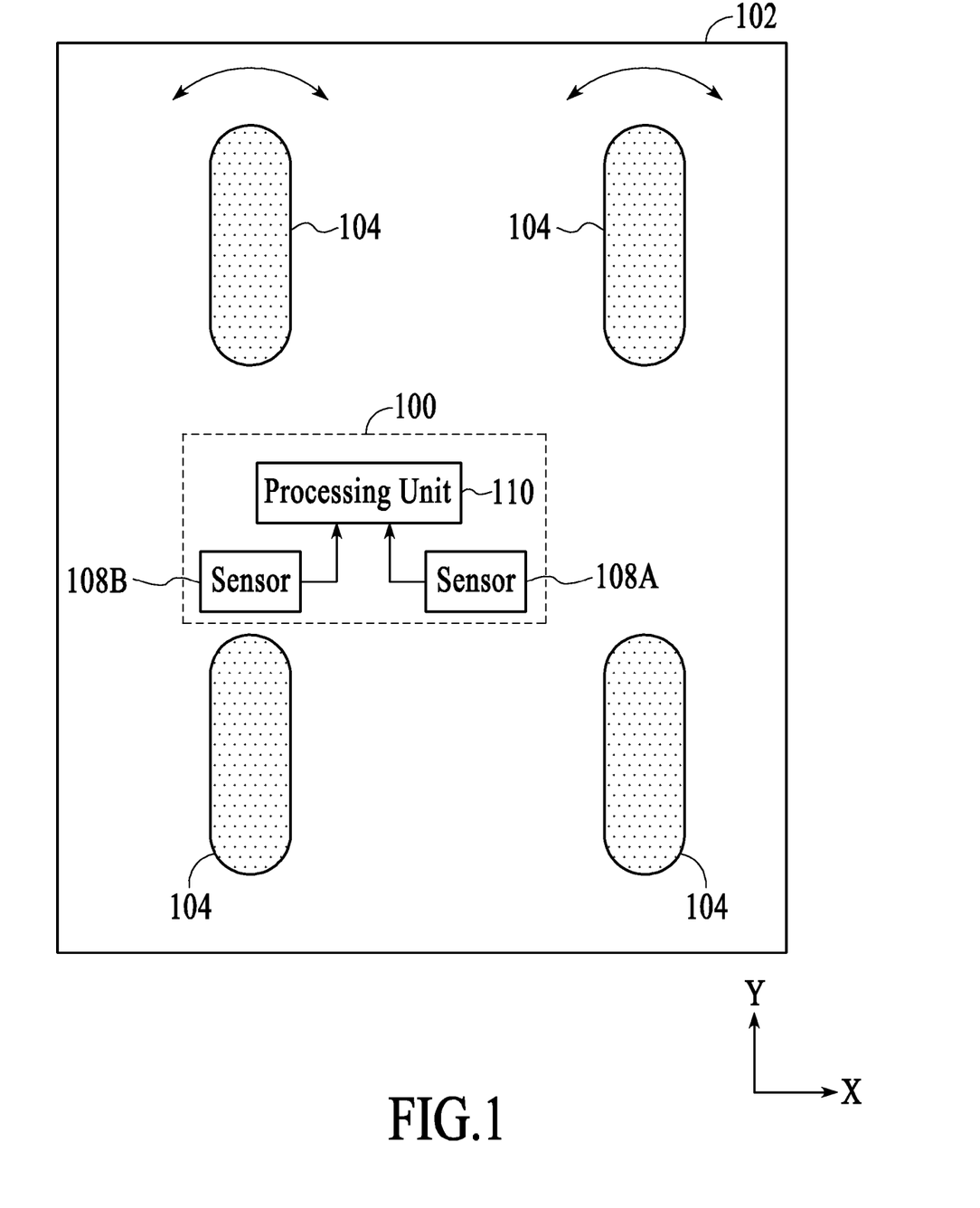
FIG. 1 is a diagram of a mobile device with an optical tracking system in accordance with an embodiment of the invention.

With reference to FIG. 1, an optical tracking system 100 in accordance with an embodiment of the invention is described. As shown in FIG. 1, the optical tracking system 100 is installed on a mobile device 102, which may be a mobile robotic device, i.e., an autonomous computer-operated device. In the illustrated embodiment, the mobile device 102 includes four wheels 104 to move the mobile device 102 on a target traveling surface 206 (shown in FIG. 2). However, in other embodiments, the mobile device 102 may include different number of wheels or may even include a different type of mechanism to move the mobile device. The optical tracking system 100 is configured to optically track the mobile device 102 using a dead-reckoning tracking process as the mobile device moves on the target traveling surface 206. As described in more detail below, the optical tracking system 100 is designed to accurately perform an optical tracking operation on different target navigation surfaces using relative referencing to track the movements of the mobile device 102.

In this embodiment, the optical tracking system 100 includes two optical sensor units 108A and 108B, and a processing unit 110. Each of the optical sensor units 108A and 108B is configured to produce displacement data indicating displacement of that optical sensor unit with respect to a target surface. As described in more detail below, the displacement data from the optical sensor unit 108B is used as reference, while the displacement data from the optical sensor unit 108A is used for the actual optical tracking operation. The optical sensor unit 108B is positioned near one of the wheels 104 to optically sense the surface of that wheel so that the rotation of the wheel can be tracked or measured. The tracked wheel surface may be the sidewall surface of the wheel or the outer surface of the wheel that contacts the target traveling surface 206, which is the surface on which the mobile device 102 is traveling. The tracked wheel may be the wheel that drives the mobile device 102 on the target traveling surface 206. The optical sensor unit 108A is positioned to optical sense the target traveling surface 206 so that the movements of the mobile device 102 relative to the target traveling surface can be tracked or measured. The processing unit 110 is configured to process the displacement data from the optical sensor unit 108A to track the movements of the mobile device 102 using the displacement data from the optical sensor unit 108B as reference.

Figure 2:
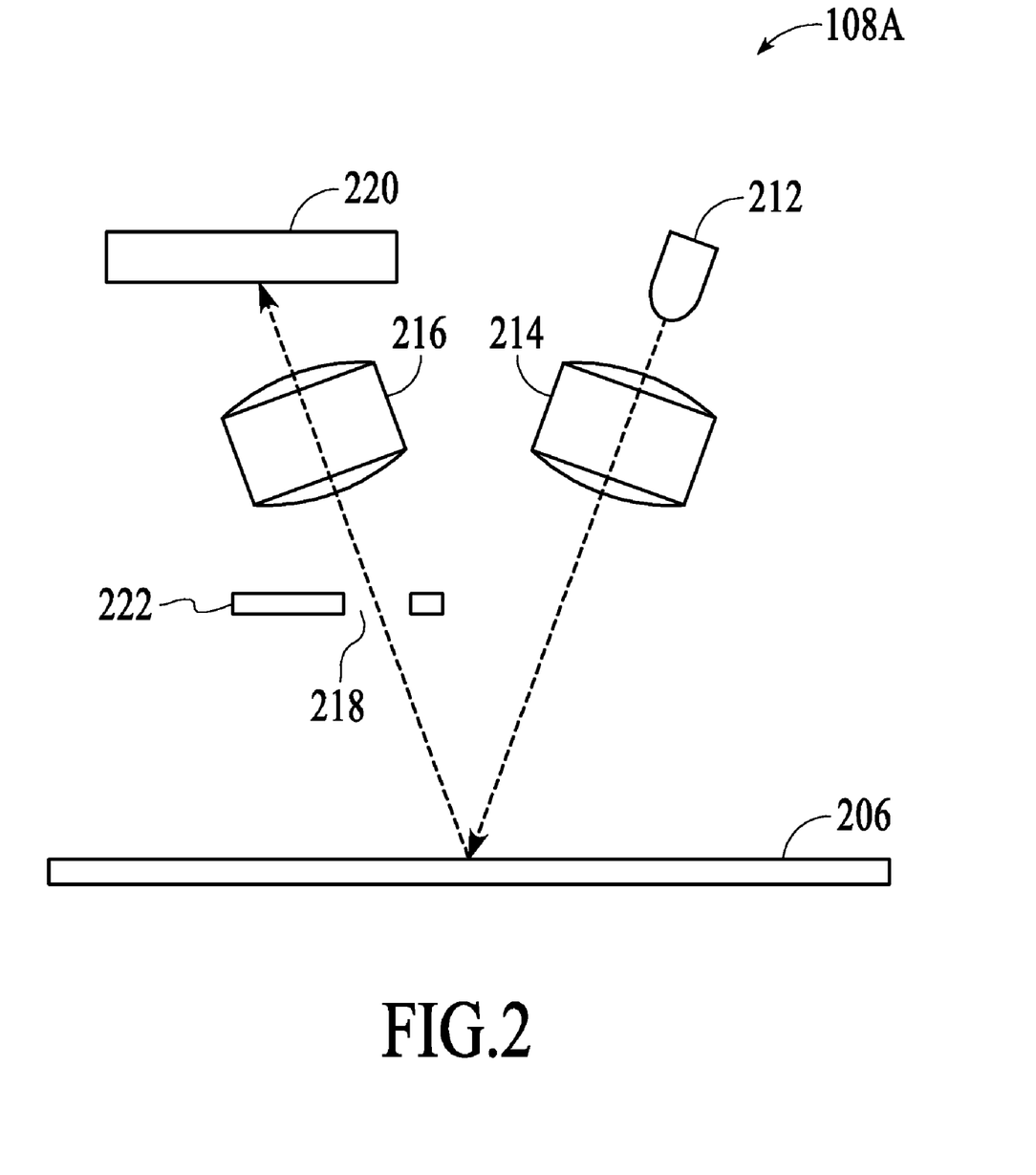
FIG. 2 is a diagram of an optical sensor unit of the optical tracking system of FIG. 1 in accordance with an embodiment of the invention.

In an embodiment, the optical sensor units 108A and 108B are identical units. Thus, only the optical sensor unit 108A is described in detail with reference to FIG. 2, which shows various components of the optical sensor unit 108A. As shown in FIG. 2, the optical sensor unit 108A includes a light source 212, an illumination lens 214, an imaging lens 216, an aperture 218 and a navigation sensor 220. The light source 212 is positioned to emit illumination light toward a target surface, which is the target traveling surface 206 for the optical sensor unit 108A. The light source 212 may be a light emitting diode, a laser diode or any other light emitting device. The illumination lens 214 is positioned between the light source 212 and the target traveling surface 206 to optically manipulate the illumination light from the light source 212 onto the target traveling surface 206. The illumination lens 214 may be configured to focus and/or collimate the illumination light from the light source 212.

The imaging lens 216 of the optical sensor unit 108A is positioned to receive the illumination light reflected from the target traveling surface 206 and transmitted through the aperture 218. The imaging lens 216 is configured to focus the received light onto the navigation sensor 220, which is described below. In the illustrated embodiment, the aperture 218 is positioned between the imaging lens 216 and the target traveling surface 206 to allow desired light from the target traveling surface 206 to reach the navigation sensor 220, while preventing unwanted light from reaching the navigation sensor. However, in other embodiments, the aperture 218 may be positioned between the imaging lens 216 and the navigation sensor 220. The aperture 218 may be provided by a hole in an opaque wall or plate 222, which may be structural part of the optical tracking system 100 or the mobile device 102.

Figure 3:
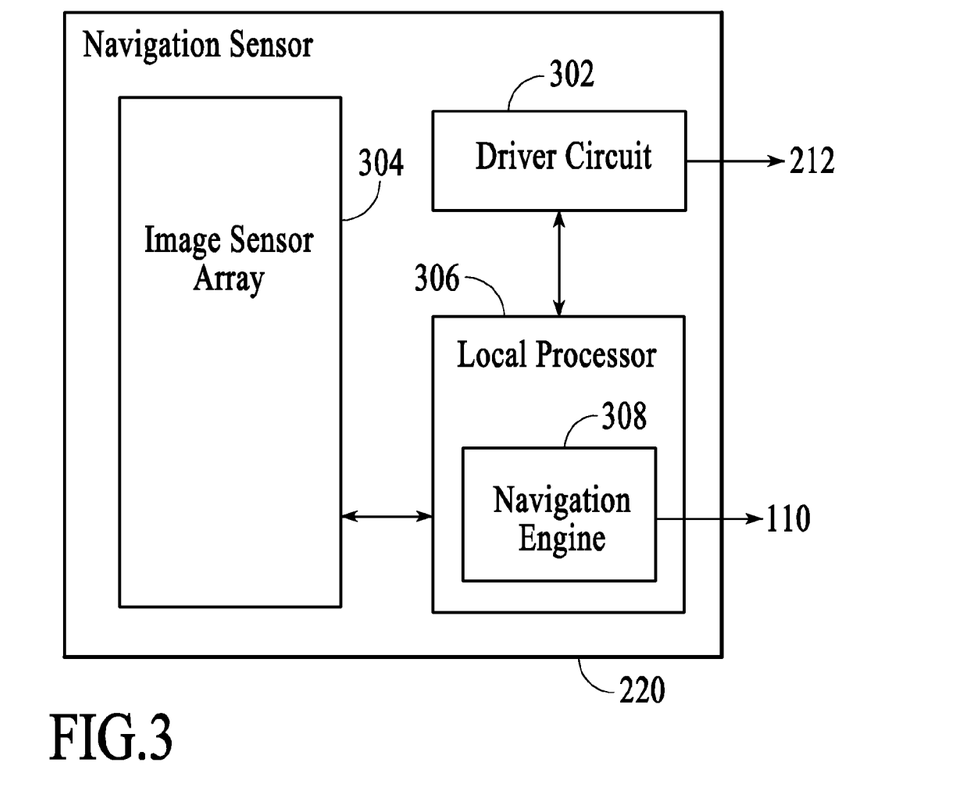
FIG. 3 is a block diagram of a navigation sensor of the optical sensor unit of FIG. 2 in accordance with an embodiment of the invention.

In an embodiment, as shown in FIG. 3, the navigation sensor 220 is an integrated circuit chip, which includes a driver circuit 302, an image sensor array 304 and a local processor 306. The navigation sensor 220 also includes supporting circuitry (not shown) for the image sensor array 304, such as an analog-to-digital converter and row and column decoders. The navigation sensor 220 may also include other elements commonly found in a conventional navigation sensor for use in an optical computer mouse.

The driver circuit 302 of the navigation sensor 220 is configured to generate driving signals for the light source 212. The driving signals from the driver circuit 302 are transmitted to the light source 212 to activate the light source to generate light, which is used to illuminate the target traveling surface 206.

The image sensor array 304 of the navigation sensor 220 is an array of photosensitive pixel elements (not shown) that generate signals in response to light incident on the elements, where each signal represents the amount or intensity of light incident on a particular element of the image sensor array. These signals are referred to herein as image data. Thus, the image sensor array 304 is able to sequentially capture frames of image data in response to incident light, i.e., the illumination light reflected from the target traveling surface 206 and received by the image sensor array. These frames of image data are used for image correlation to estimate any relative displacement between the optical sensor unit 108A and the target traveling surface 206. As an example, the image sensor array 304 may be a charge-coupled device (CCD) imaging array or a complementary metal oxide semiconductor (CMOS) imaging array. The number of photosensitive pixel elements included in the image sensor array 304 may vary. As an example, the image sensor array 304 may be a 30×30 array of photosensitive pixel elements.

The local processor 306 of the navigation sensor 220 is configured to control various components of the navigation sensor, including the driver circuit 302 and the image sensor array 304, in order to provide illumination light on the target traveling surface 206 and to electronically capture frames of image data in response to the illumination light reflected from the target traveling surface. The local processor 306 is electrically connected to the driver circuit 302 to provide control signals to the driver circuit to direct the driver circuit to apply driving signals to the light source 212 to activate the light source. The local processor 306 is also electrically connected to the image sensor array 304 via supporting circuitry to provide control signals to control the accumulation of electrical signals or charges at the photosensitive pixel elements of the image sensor array to produce each frame of image data for correlation. Thus, the local processor 306 is able to control the frame rate of the image sensor array 304.

The local processor 306 may be a general-purpose digital processor such as a microprocessor or microcontroller. In other embodiments, the local processor 306 may be a special-purpose processor such as a digital signal processor. In other embodiments, the local processor 306 may be another type of controller or a field programmable gate array (FPGA).

In an embodiment, the local processor 306 includes a navigation engine 308, which is programmed into the local processor. However, in other embodiments, the navigation engine 308 may be a separate component. The navigation engine 308 can be implemented in any combination of software, hardware and/or firmware. The navigation engine 308 operates to correlate the frames of image data captured by the image sensor array 304 to estimate any lateral displacement changes between the optical sensor unit 108A and the target traveling surface 206 with respect to X and Y directions, which are parallel to the target traveling surface, as indicated in FIG. 1. The process of correlating frames of image data for motion estimation or navigation is well known, and thus, is not described herein. In an embodiment, the output of the navigation engine 308 includes directional delta x displacement values and directional delta y displacement values. Each directional displacement value includes a negative or positive sign information, which indicates direction, and an absolute displacement value, which indicates the amount of displacement in that direction. Thus, the x displacement value indicates displacement change along the X axis, while the y displacement value indicates displacement change along the Y axis. In a particular implementation, the directional delta x and y displacement values are generated in the form of hex numbers.

Although the driver circuit 302, the image sensor array 304 and the local processor 308 are integrated into the navigation sensor 220 in the illustrated embodiment, some or all of these components may be physically separate devices in other embodiments. Also, in other embodiments, some of the components of the navigation sensor 220, such as the navigation engine 308, may be integrated into the processing unit 110. Furthermore, some of the functions of the local processor 308 may be performed by the processing unit 110.

The processing unit 110 is electrically connected to the optical sensor units 108A and 108B to receive x and y directional displacement values from the optical sensor units. As described below, the processing unit 110 is configured to process the x and y directional displacement values from the optical sensor unit 108A to accurately track the movements of the mobile device 102 using the x and y directional displacement values from the optical sensor unit 108B as reference, as well as detect slippage between the optically tracked wheel 104 and the target traveling surface 206.

Figure 4:
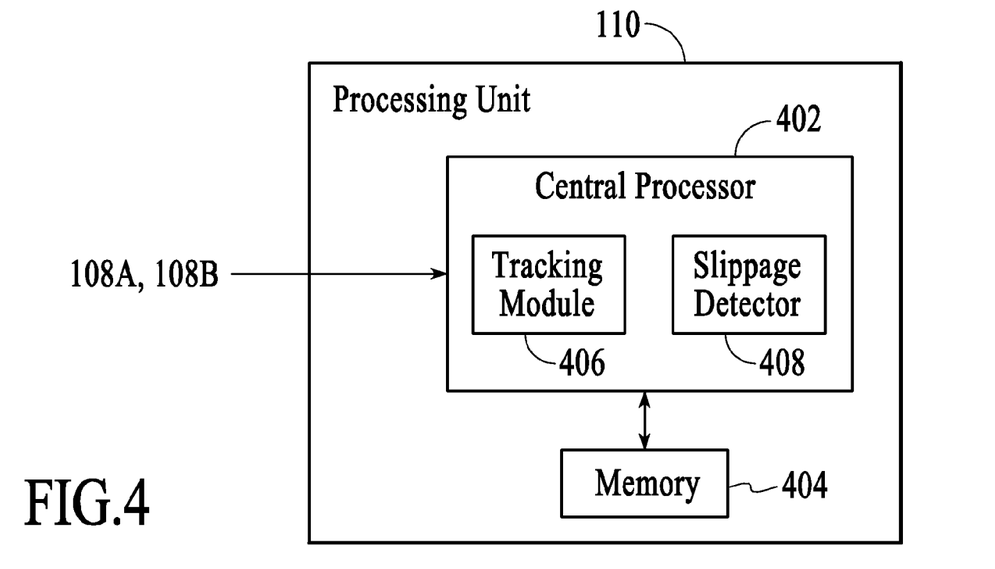
FIG. 4 is a block diagram of a processing unit of the optical tracking system of FIG. 1 in accordance with an embodiment of the invention.

As shown in FIG. 4, the processing unit 110 includes a central processor 402 and memory 404. The central processor 402 may be a general-purpose digital processor such as a microprocessor or microcontroller. In other embodiments, the central processor 402 may be a special-purpose processor such as a digital signal processor. In other embodiments, the central processor 402 may be another type of controller or a FPGA. The memory 404 is used to store data and/or programs for use by the central processor 402. The memory 404 can be any type of a storage device.

In an embodiment, the central processor 402 includes a tracking module 406 and a slippage detector 408, which are programmed into the central processor. However, in other embodiments, one or both of the tracking module 406 and the slippage detector 408 may be separate components. The tracking module 406 and the slippage detector 408 can be implemented in any combination of software, hardware and/or firmware.

The tracking module 406 is configured to perform a tracking process using relative referencing. The tracking module 406 is configured to translate latest or current x and y directional displacement (CUR-ACT) values from the navigation sensor unit 108A using four tracking coefficient (COEF) values to produce directional movement (MOV) values, which indicates the actual relative movement between the optical tracking system 100 (and thus the mobile device 102) and the target traveling surface 206. The MOV values may indicate any unit of length, such as meter or foot. The four COEF values may be computed by the tracking module 406 during set-up and stored in the memory 404.

In an embodiment, the four COEF values are computed using four reference directional displacement values for fixed movement distances, or REF values, and four actual directional displacement values for the same fixed movement distances, or ACT values. The REF values are produced using displacement values from the optical sensor unit 108B, which are referred to herein as CUR-REF values. The ACT values are produced using CUR-ACT values from the optical sensor unit 108A. The four REF values are produced by moving the mobile device 102 for a predefined distance on the target traveling surface 206 along each of the following four directions: the positive X direction, the negative X direction, the positive Y direction and the negative Y direction, and then summing x and y CUR-REF values from the optical sensor unit 108B. Similarly, the four ACT values are produced by moving the mobile device 102 for the same predefined distance on the target traveling surface 206 along each of the same four directions: the positive X direction, the negative X direction, the positive Y direction and the negative Y direction, and then summing x and y CUR-ACT values from the optical sensor unit 108A. The REF and ACT values may be produced simultaneously or sequentially for each movement direction. Each of the four COEF values is computed using the following equation: COEF=ACT/REF, where the COEF, ACT and REF values are values for the same direction. For instance, the COEF value for the positive X direction is computed by dividing the ACT value for the positive X direction by the REF value for the positive X direction. The other COEF values for the negative X direction, the positive Y direction and the negative Y direction are computed in a similar manner. Thus, the COEF values define a relationship between the CUR-ACT values from the optical sensor unit 108A and the CUR-REF values from the optical sensor unit 108B.

During a normal tracking operation, the tracking module 406 is configured to receive latest or current x and y CUR-ACT values from the optical sensor unit 108A and then to translate the CUR-ACT values using the appropriate COEF values to produce translated movement values, which can be used to accurately track the movements of the mobile device 102. The translated movement values will be referred to herein as MOV values. The MOV values are computed using the following equation: MOV=CUR-ACT/COEF, where the MOV, CUR-ACT and COEF values are values for the same direction. For instance, if the CUR-ACT values are both positive numbers for the X and Y directions, the MOV value for the X direction is computed by dividing the CUR-ACT value for the X direction by the COEF value for the positive X direction and the MOV value for the Y direction is computed by dividing the CUR-ACT value for the Y direction by the COEF value for the positive Y direction.

The slippage detector 408 is configured to detect when there is slippage between the tracked wheel 104, which is being optically tracked by the optical sensor unit 108B, and the target traveling surface 206, which is being optically tracked by the optical sensor unit 108A. In an embodiment, the slippage detector 408 is configured to detect slippage using only the CUR-ACT values. In this technique, the latest CUR-ACT values are monitored to see if there are significant variations between the CUR-ACT values and expected values. As an example, if the mobile device 102 is being moved at a constant speed, i.e., the mobile device 102 is being driven at a fixed power, the CUR-ACT values are expected to remain at a particular level. However, if the CUR-ACT values significantly decrease, then slippage is assumed. As another example, if no power is being applied to the mobile device 102, the CUR-ACT values are expected to decrease toward zero. However, if the CUR-ACT values do not significantly decrease, then slippage is assumed. In this technique, CUR-REF values from the optical sensor unit 108B are not used since the CUR-REF values are not needed for slippage detection.

In another embodiment, the slippage detector 408 is configured to detect slippage using the latest CUR-REF values as well as the latest CUR-ACT values. In this technique, the CUR-REF values from the optical sensor unit 108B and the CUR-ACT values from the optical sensor unit 108A are both monitored to see if there are significant differences between the CUR-REF and CUR-ACT values using the calibrated COEF values as reference. The calibrated COEF values are the fixed COEF values that were computed during set-up using the REF and ACT values from the optical sensor units 108A and 108B. In one implementation, the slippage detector 408 receives the latest CUR-REF and CUR-ACT values from the optical sensor units 108A and 108B and computes current COEF values using the following equation: current COEF=CUR-ACT/CUR-REF. If the current COEF values significantly deviate from the corresponding calibrated COEF values, then slippage is assumed. As an example, slippage can be assumed if a current COEF value deviates by ten percent from the corresponding calibrated COEF value. However, other thresholds can be used for the current and calibrated COEF values to assume that there is slippage.

The slippage detector 408 may use one or both of the above techniques to detect slippage. Slippage detection can be used for post data processing. As an example, slippage data can be used to determine the performance of the tire on the wheel 104 being optically tracked. Slippage detection can also be used for real-time processing. As an example, slippage data can be used to move the mobile device 102 from a slippery area of the target traveling surface 206.

Figure 5:
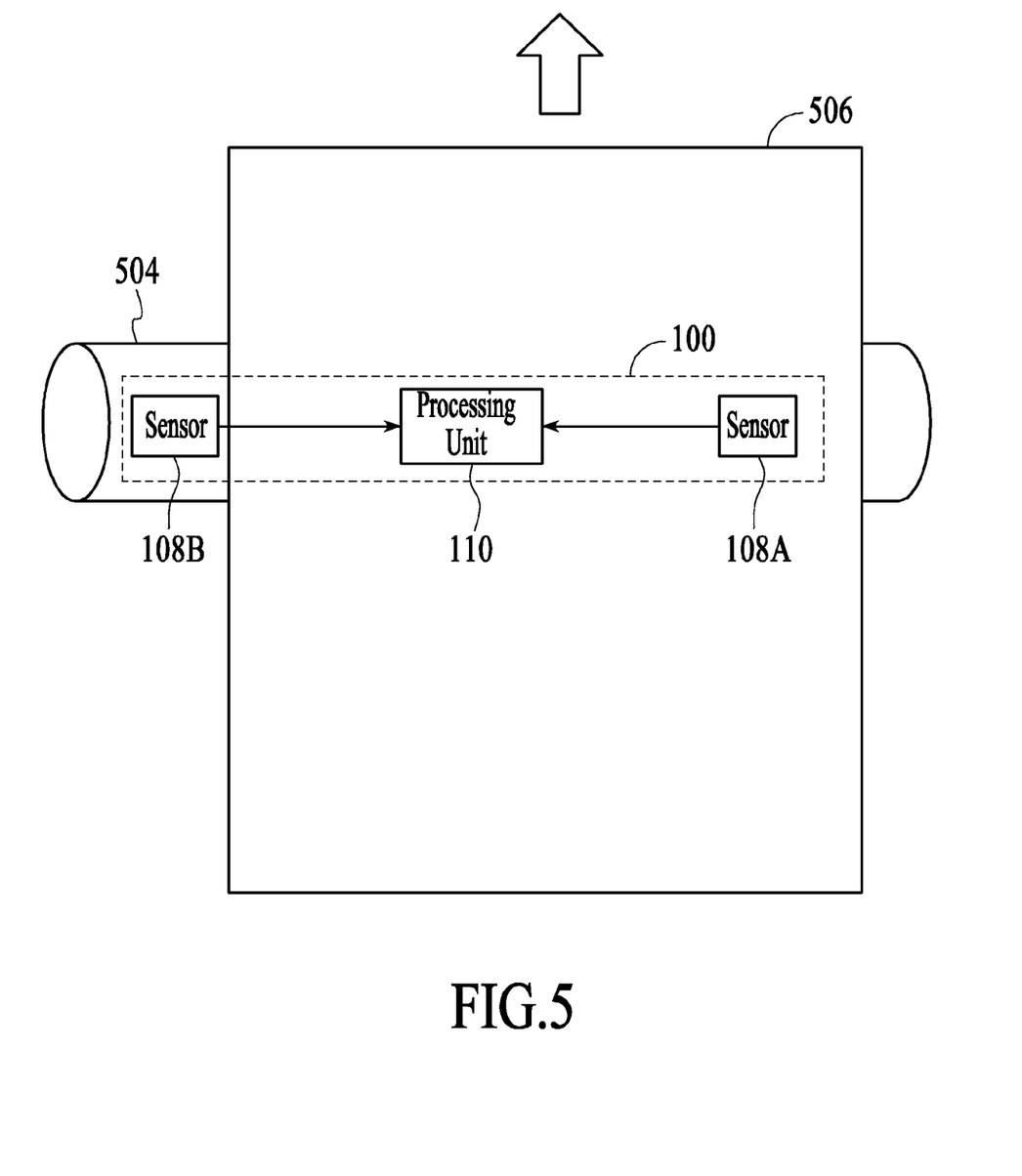
FIG. 5 is a diagram of the optical tracking system implemented in a printer in accordance with an embodiment of the invention.

In other embodiments, the optical tracking system 100 may be implemented in other devices or machineries. As an example, the optical tracking system 100 may be implemented in a printer or other device in which one or more sheets of material, such as sheets of paper, are moved by a roller or other movable member that contacts the sheets of material. In this example, as illustrated in FIG. 5, the optical sensor unit 108B of the optical tracking system 100 is positioned to optically track the surface of a roller 504, which may be part of a printer, and the other optical sensor unit 108A is positioned to optically track the surface of a sheet of paper 506, which is being displaced by the roller 504. Thus, in this example, the CUR-REF values from the optical sensor unit 108B are displacement values with respect to the rotation of the roller 504, and the CUR-ACT values from the optical sensor unit 108A are displacement values with respect to the movement of the sheet of paper 506. Thus, in this example, the optical tracking system 100 operates to optically track the movements of the sheet of paper 506 and to detect slippage between the roller 504 and the sheet of paper.

In some embodiments, the optical tracking system 100 may include only a single optical sensor unit. As an example, the optical tracking system 100 in FIG. 5 may include only the optical sensor unit 108A. In this example, the REF values can be produced during set-up without the presence of the sheet of paper 506 on the roller 504. Thus, the optical sensor unit 108A can be used to optically track the surface of the roller 504 to produce the REF values. Then, the ACT values can be produced during set-up with the presence of the sheet of paper 506 on the roller 504. Thus, the same optical sensor unit 108A can be used to optically track the paper surface to produce the ACT values. Consequently, in this single sensor implementation, only the CUR-ACT values from the optical sensor 108A are used during a normal optical tracking operation. In other embodiments, the optical tracking system 100 may include more than the two optical sensor units 108A and 108B. The additional optical sensor units can be used to optically track additional wheels, rollers or other movable members.

Figure 6:
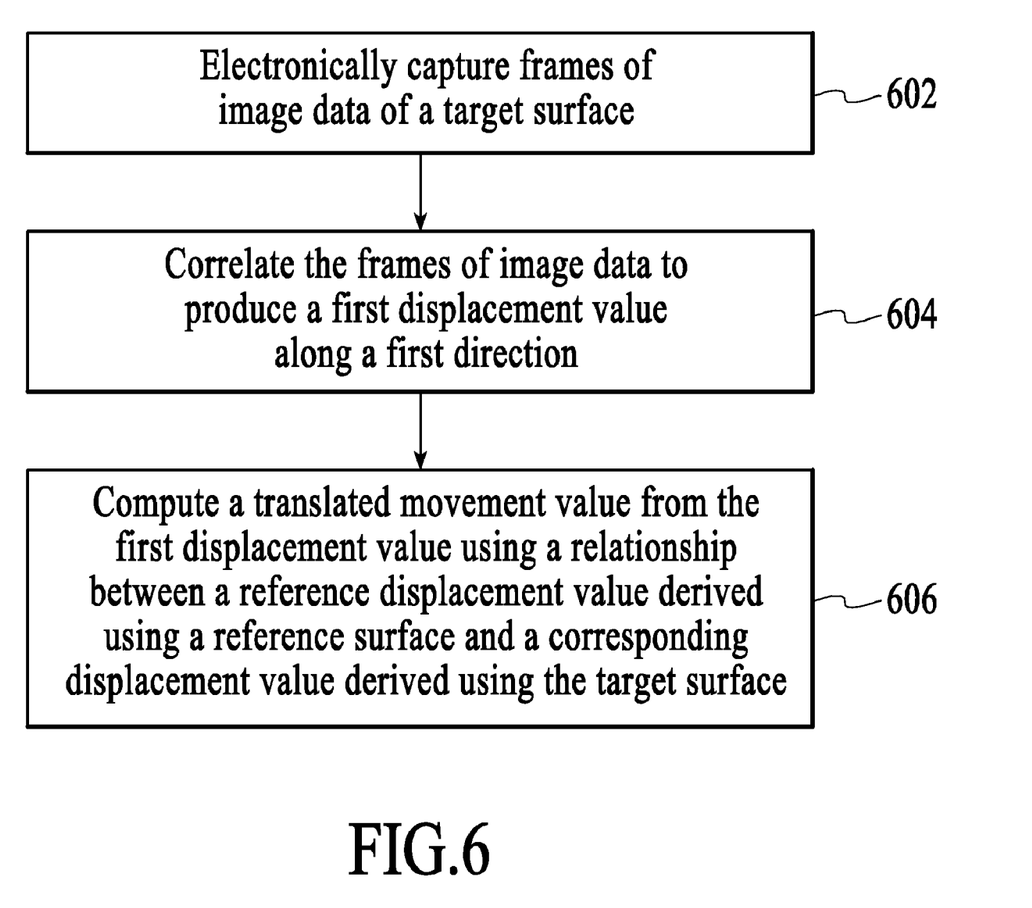
FIG. 6 is a process flow diagram of a method for performing an optical tracking operation in accordance with an embodiment of the invention.

A method for performing an optical tracking operation in accordance with an embodiment of the invention is described with reference to a process flow diagram of FIG. 6. At block 602, frames of image data of a target surface are electronically captured. Next, at block 604, the frames of image data are correlated to produce a first displacement value along a first direction. Next, at block 606, a translated movement value is computed from the first displacement value using a relationship between a reference displacement value derived using a reference surface and a corresponding displacement value derived using the target surface. The translated movement value is used for the optical tracking operation.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for performing an optical tracking operation comprising:
    an optical sensor unit configured to optically sense a target surface to produce at least a first displacement value along a first direction using image correlation; and
    a processing unit operably connected to the optical sensor unit to receive the first displacement value, the processing unit being configured to compute a translated movement value from the first displacement value using a relationship between a reference displacement value derived using a reference surface and a corresponding displacement value derived using the target surface, the translated movement value being used for the optical tracking operation.

2. The system of claim 1 wherein the processing unit is configured to compute the translated movement value using a tracking coefficient value, the tracking coefficient value being derived by dividing the corresponding displacement value by the reference displacement value.

3. The system of claim 2 wherein the processing unit is configured to compute the translated movement value by dividing the first displacement value by the tracking coefficient value.

4. The system of claim 1 wherein the reference displacement value and the corresponding displacement value are generated by the optical sensor unit, the reference displacement value being generated using frames of image data of a surface of a movable member that is in contact with the target surface, the surface of the movable member being the reference surface, the corresponding displacement value being generated using frames of image data of the target surface.

5. The system of claim 1 further comprising a second optical sensor unit configured to produce at least another first displacement value along the first direction using image correlation, wherein the reference displacement value is generated by the second optical sensor unit using frames of image data of a surface of a movable member that is in contact with the target surface, the surface of the movable member being the reference surface, and wherein the corresponding displacement value is generated by the optical sensor unit using frames of image data of the target surface.

6. The system of claim 5 wherein the processing unit is configured to detect slippage by comparing reference displacement values from the second optical sensor unit and current displacement values from the optical sensor unit with respect to the tracking coefficient.

7. The system of claim 5 wherein the second optical sensor unit is positioned to optically track a surface of a roller that is in contact with a sheet of material, the reference surface being the surface of the roller, the target surface being a surface of the sheet of material.

8. The system of claim 5 wherein the second optical sensor unit is positioned to optically track a surface of a wheel that is in contact with a traveling surface, the reference surface being the surface of the wheel, the target surface being the traveling surface.

9. A method for performing an optical tracking operation, the method comprising:
  electronically capturing frames of image data of a target surface;
  correlating the frames of image data to produce a first displacement value along a first direction; and
  computing a translated movement value from the first displacement value using a relationship between a reference displacement value derived using a reference surface and a corresponding displacement value derived using the target surface, the translated movement value being used for the optical tracking operation.

10. The method of claim 9 wherein the computing includes computing the translated movement value using a tracking coefficient value, the tracking coefficient value being derived by dividing the corresponding displacement value by the reference displacement value.

11. The method of claim 10 wherein the computing the translated movement value using the tracking coefficient value includes computing the translated movement value by dividing the first displacement value by the tracking coefficient value.

12. The method of claim 9 further comprising generating the reference displacement value and the corresponding displacement value using a single optical sensor unit, the reference displacement value being generated using frames of image data of a surface of a movable member that is in contact with the target surface, the surface of the movable member being the reference surface, the corresponding displacement value being generated using frames of image data of the target surface.

13. The method of claim 9 further comprising generating the corresponding displacement value using a first optical sensor unit and generating the reference displacement value using a second optical sensor unit, the reference displacement value being generated by the second optical sensor unit using frames of image data of a surface of a movable member that is in contact with the target surface, the surface of the movable member being the reference surface, and wherein the corresponding displacement value is generated by the first optical sensor unit using frames of image data of the target surface.

14. The method of claim 13 further comprising comparing reference displacement values from the second optical sensor unit and current displacement values from the first optical sensor unit with respect to the tracking coefficient to detect slippage between the movable member and the target surface.

15. The method of claim 13 wherein the second optical sensor unit is positioned to optically track a surface of a roller that is in contact with a sheet of material, the reference surface being the surface of the roller, the target surface being a surface of the sheet of material.

16. The method of claim 13 wherein the second optical sensor unit is positioned to optically track a surface of a wheel that is in contact with a traveling surface, the reference surface being the surface of the wheel, the target surface being the traveling surface.

17. A system for performing an optical tracking operation comprising:
  an optical sensor unit configured to optically sense a target surface to produce at least a first displacement value along a first direction, the optical sensor unit comprising:
    a light source configured to emit illumination light toward a target surface;
    an image sensor array positioned to receive the illumination light reflected from the target surface, the image sensor array being configured to generate frames of image data in response to the received illumination light; and
    a navigation engine operably connected to the image sensor array to receive the frames of image data, the navigation engine being configured to correlate the frames of image data to produce at least the first displacement; and
  a processing unit operably connected to the optical sensor unit to receive the first displacement value, the processing unit being configured to compute a translated movement value from the first displacement value using a relationship between a reference displacement value derived using a reference surface and a corresponding displacement value derived using the target surface, the translated movement value being used for the optical tracking operation.

18. The system of claim 17 wherein the processing unit is configured to compute the translated movement value using a tracking coefficient value, the tracking coefficient value being derived by dividing the corresponding displacement value by the reference displacement value.

19. The system of claim 17 wherein the reference displacement value and the corresponding displacement value are generated by the optical sensor unit, the reference displacement value being generated using frames of image data of a surface of a movable member that is in contact with the target surface, the surface of the movable member being the reference surface, the corresponding displacement value being generated using frames of image data of the target surface.

20. The system of claim 17 further comprising a second optical sensor unit configured to produce at least another first displacement value along the first direction using image correlation, wherein the reference displacement value is generated by the second optical sensor unit using frames of image data of a surface of a movable member that is in contact with the target surface, the surface of the movable member being the reference surface, and wherein the corresponding displacement value is generated by the optical sensor unit using frames of image data of the target surface.

* * * * *